US012566349B2

(12) United States Patent
Li et al.

(10) Patent No.: US 12,566,349 B2
(45) Date of Patent: Mar. 3, 2026

(54) PIXEL UNIT, DISPLAY SUBSTRATE, DISPLAY PANEL, AND DISPLAY DEVICE

(71) Applicants:CHENGDU BOE DISPLAY SCI-TECH CO., LTD., Chengdu (CN); BOE TECHNOLOGY GROUP CO., LTD., Beijing (CN)

(72) Inventors: Fan Li, Beijing (CN); Lin Peng, Beijing (CN); Kambe Makoto, Beijing (CN); Yong Zhang, Beijing (CN); Panqiang Wu, Beijing (CN); Congcong Liu, Beijing (CN); Ju Ren, Beijing (CN); Lin Li, Beijing (CN)

(73) Assignees: CHENGDU BOE DISPLAY SCI-TECH CO., LTD., Chengdu (CN); BOE TECHNOLOGY GROUP CO., LTD., Beijing (CN)

( * ) Notice: Subject to any disclaimer, the term of this patent is extended or adjusted under 35 U.S.C. 154(b) by 25 days.

(21) Appl. No.: 18/030,322

(22) PCT Filed: Apr. 29, 2022

(86) PCT No.: PCT/CN2022/090676
§ 371 (c)(1),
(2) Date: Apr. 5, 2023

(87) PCT Pub. No.: WO2023/206534
PCT Pub. Date: Nov. 2, 2023

(65) Prior Publication Data
US 2024/0369882 A1     Nov. 7, 2024

(51) Int. Cl.
*G02F 1/1337*     (2006.01)
*G02F 1/1343*     (2006.01)

(52) U.S. Cl.
CPC .. *G02F 1/133707* (2013.01); *G02F 1/133757* (2021.01); *G02F 1/133761* (2021.01); *G02F 1/13439* (2013.01)

(58) Field of Classification Search
CPC ......... G02F 1/133707; G02F 1/133753; G02F 1/133757; G02F 1/133761
See application file for complete search history.

(56) References Cited

U.S. PATENT DOCUMENTS

2015/0070611 A1     3/2015  Shima et al.
2016/0246135 A1*    8/2016  Tae ................... G02F 1/133707
(Continued)

FOREIGN PATENT DOCUMENTS

CN         102981312 B     1/2016
CN         105487300 A     4/2016
(Continued)

*Primary Examiner* — Paisley L Wilson
(74) *Attorney, Agent, or Firm* — WHDA, LLP

(57)     ABSTRACT

The present disclosure provides a pixel unit, a display substrate, a display panel, and a display device. The pixel unit includes a slit electrode having a slit. The pixel unit includes at least two sub-pixels corresponding to different colors, each of the pixels includes n domain areas arranged along a first direction, n is a positive integer greater than or equal to 2, extension directions of the slits of the slit electrodes in any two adjacent domain areas in the n domain areas of the pixel unit are different, an acute angle between an extension direction of the slit in each domain area and a second direction is a predetermined angle, the predetermined angle is greater than or equal to 30° and less than 45°, and the second direction intersects with the first direction.

15 Claims, 25 Drawing Sheets

(56) References Cited

U.S. PATENT DOCUMENTS

| 2018/0107036 A1 | 4/2018 | Shao et al. |
| 2020/0225540 A1 | 7/2020 | Shimoshikiryoh et al. |

FOREIGN PATENT DOCUMENTS

| CN | 110998423 A | 4/2020 |
| CN | 111474775 A | 7/2020 |
| CN | 112596309 A | 4/2021 |
| CN | 113589607 A | 11/2021 |
| TW | 201400950 A | 1/2014 |

* cited by examiner (a)          (b)          (c)

(a)          (b)

PIXEL UNIT, DISPLAY SUBSTRATE, DISPLAY PANEL, AND DISPLAY DEVICE

CROSS-REFERENCE TO RELATED APPLICATION

The present application is the U.S. national phase of PCT Application No. PCT/CN2022/090676 filed on Apr. 29, 2022, the entire content of which is incorporated herein by reference.

TECHNICAL FIELD

The present disclosure relates to the technical field of display, and particularly, to a pixel unit, a display substrate, a display panel, and a display device.

BACKGROUND

In a liquid crystal display panel, each pixel electrode usually corresponds to a plurality of domain areas. The pixel electrode is provided with a slit or a protrusion. The liquid crystal molecules in different domain areas have different tilt states. Due to the asymmetric turning of liquid crystal molecules in a pixel in a vertical alignment mode liquid crystal displayer, the left-right viewing angle color deviation and the CR (80/20) level difference affect the optical performance.

SUMMARY

Embodiments of the present disclosure provide a pixel unit, a display substrate, a display panel, and a display device, which can improve the color deviation of the display device.

The technical solutions provided by the embodiments of the present disclosure are as follows.

A pixel unit comprises a slit electrode having a slit; the pixel unit comprises at least two sub-pixels corresponding to different colors, each of the pixels comprises n domain areas arranged along a first direction, n is a positive integer greater than or equal to 2, extension directions of the slits of the slit electrodes in any two adjacent domain areas in the n domain areas of the pixel unit are different, an acute angle between an extension direction of the slit in each domain area and a second direction is a predetermined angle, the predetermined angle is greater than or equal to 30° and less than 45°, and the second direction intersects with the first direction.

Illustratively, the predetermined angle is greater than or equal to 35° and less than 45°.

Illustratively, the slit electrode comprises a plurality of branch electrodes arranged parallel to each other and spaced apart in each domain area, an inter-domain main electrode extending along the second direction is provided between two adjacent domain areas, and the branch electrodes in two adjacent domain areas are in mirror symmetry with respect to the inter-domain main electrode.

Illustratively, each domain area comprises a first side and a second side opposite to each other in the first direction, and a plurality of domain areas comprise a first domain area, a second domain area . . . and an nth domain area arranged sequentially from the first side to the second side, wherein a slit of the first domain area extends to a boundary of the first side such that the boundary of the first side forms a non-closed structure in which a plurality of the slits and a plurality of the branch electrodes are interleaved.

Illustratively, each domain area comprises the first side and the second side opposite to each other in the first direction, and a plurality of domain areas comprise the first domain area, the second domain area . . . and the nth domain area arranged sequentially from the first side to the second side, wherein a slit of the nth domain area extends to a boundary of the second side such that the boundary of the second side forms the non-closed structure in which a plurality of the slits and a plurality of the branch electrodes are interleaved.

Illustratively, each domain area comprises a third side and a fourth side opposite to each other in the second direction, and a plurality of domain areas comprise the first domain area, the second domain area . . . an mth domain area . . . and the nth domain area arranged sequentially from the first side to the second side, m is a positive integer greater than 1 and less than n, wherein at least one slit of the mth domain area extends to a boundary of the third side such that the boundary of the second side forms the non-closed structure in which a plurality of the slits and a plurality of the branch electrodes are interleaved, and the third side is a side of the mth domain area forming a dark line.

Illustratively, slits of the domain areas other than the first domain area and the nth domain area extend to the boundary of the third side.

Illustratively, at least one slit of the mth domain area extends to a boundary of the fourth side such that the boundary of the second side forms the non-closed structure in which a plurality of the slits and a plurality of the branch electrodes are interleaved; alternatively, at least one of the mth domain areas has a domain boundary main electrode extending along the first direction at the boundary of the fourth side.

Illustratively, the slit electrode is at least one of a pixel electrode and a common electrode.

Embodiments of the present disclosure also provide a display substrate for forming a liquid crystal display panel aligned with another substrate; wherein the liquid crystal display panel comprises the pixel unit described above, the display substrate comprises a first electrode, the another substrate comprises a second electrode, and at least one of the first electrode and the second electrode corresponding to each domain area has the slit.

Illustratively, the display substrate is an array substrate, the first electrode is the pixel electrode, the another substrate is a color film substrate, and the second electrode is the common electrode.

Illustratively, the display substrate is the color film substrate, the first electrode is the common electrode, the another substrate is the array substrate, and the second electrode is the pixel electrode.

Embodiments of the present disclosure also provide a display panel, comprising:

the array substrate described above, comprising a first substrate, a first alignment film located on the first substrate, and the pixel electrode located on a side of the first alignment film away from the first substrate;

the color film substrate described above, comprising a second substrate, a second alignment film located on the second substrate, and the common electrode located on a side of the second alignment film away from the second substrate;

and a liquid crystal molecule located between the array substrate and the color film substrate;

wherein the alignment force of the first alignment film and/or the second alignment film is used to cause the liquid crystal molecules to have different predetermined tilt angles in each domain area.

Illustratively, the predetermined tilt angles of the liquid crystal molecules in the different domain areas are different and the liquid crystal molecules in two adjacent domain areas are not in mirror symmetry with respect to the second direction.

Illustratively, an angle between an alignment direction of the first alignment film and/or the second alignment film in each domain area and an extension direction of the slit in this domain area is less than or equal to a predetermined angle.

Illustratively, the predetermined angle is 0° to 15°.

Illustratively, the display panel is a vertically aligned display panel.

Embodiments of the present disclosure also provide a display device comprising the display panel described above.

Advantageous effects brought about by embodiments of the present disclosure are as follows.

The pixel unit, the display substrate, the display panel, and the display device provided by the embodiments of the present disclosure can improve the color deviation phenomenon by designing the extension direction of the slit in each domain area in the pixel to be greater than or equal to 30° and less than 45°.

DETAILED DESCRIPTION

Figure 1:
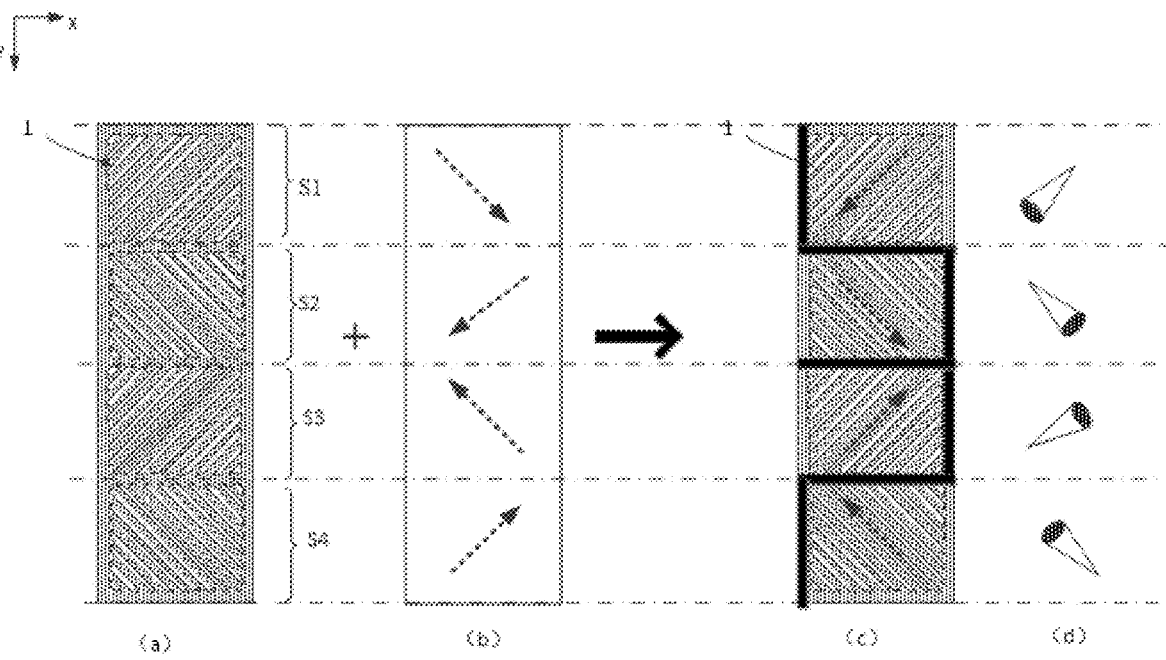
FIG. 1 illustrates a schematic diagram of a slit tilt direction and an alignment force direction in a sub-pixel in a pixel unit of a vertically aligned display panel in the related art.

To make the purpose, technical solutions, and advantages of the embodiments of the present disclosure clearer, the technical solutions of embodiments of the present disclosure will be clearly and completely described below in conjunction with the accompanying drawings in embodiments of the present disclosure. Obviously, the described embodiments are a portion of the embodiments of the present disclosure and not all of them. Based on the described embodiments of the present disclosure, all other embodiments obtained by those of ordinary skills in the art without inventive effort are within the scope of the present disclosure.

Unless defined otherwise, technical or scientific terms used in the present disclosure shall have the ordinary meaning as understood by those of ordinary skills in the art to which the present disclosure belongs. The use of "first", "second", and the like in the present disclosure does not denote any order, quantity, or importance, but rather is used to distinguish one element from another. Likewise, terms such as "a", "an", or "the" do not denote a limitation of quantity, but rather denote the presence of at least one of the referenced items. The word "comprising" or "comprises", and the like, means that the presence of an element or item preceding the word covers the presence of the element or item listed after the word and equivalents thereof, but does not exclude other elements or items. The terms "connected", "coupled", or "linked" and the like, are not limited to physical or mechanical connections, but may include electrical connections, whether direct or indirect. The terms "upper", "lower", "left", "right" and the like are used only to indicate relative positional relationships that may change accordingly when the absolute position of the object being described changes.

Before describing the pixel unit, the display substrate, the display panel, and the display device provided by the embodiments of the present disclosure in detail, it is necessary to describe the related art as follows.

In the related art, the liquid crystal itself in the liquid crystal display device does not emit light. Liquid crystal displays control the light transmittance of a liquid crystal unit by controlling the twist of liquid crystal molecules through an electric field, thereby achieving the purpose of display. In a liquid crystal displayer of Vertical Alignment (VA) mode, a liquid crystal unit is constructed using a liquid crystal exhibiting negative dielectric anisotropy. A liquid crystal display of vertical alignment mode generally includes a color filter (CF) substrate and a Thin film Transistor (TFT) substrate. A common electrode and a pixel electrode are respectively provided on the CF substrate and the TFT substrate, where at least one of the pixel electrode and the common electrode is provided with a slit, i.e., an Indium Tin Oxides (ITO) Slit or a protrusion.

In the case of a liquid crystal display device without applying a voltage, liquid crystal molecules are arranged perpendicular to a substrate, and an electric signal can be applied through the common electrode and the pixel electrode respectively provided on the color film substrate and the array substrate. Under an applied voltage, the liquid crystal molecules tend to arrange perpendicular to the direction of the electric field, thus deviating from the direction perpendicular to the substrate. The specific deflection angle depends on the magnitude of the applied bias voltage. In this way, the modulation of the liquid crystal molecules is realized by the voltage signal, and the light transmission characteristics of the liquid crystal pixels are changed to realize the display of an image.

When the liquid crystal molecules are tilted at a certain angle, the viewer will observe different display effects from different angles, which is a problem of the viewing angle of the liquid crystal display device. In order to solve the problem of the viewing angle, a vertically oriented liquid crystal display device designs a plurality of sub-regions, i.e., a plurality of domain areas, having different slit tilt angles in a pixel, and the display characteristic of the pixel is an effect of spatially integrating and averaging the respective domain areas therein. In this way, the difference seen when observing the liquid crystal display device from different angles is reduced and the viewing angle is improved. Usually tilt conditions of the liquid crystal molecules in the pixel area are divided into at least four domain areas. The slit tilt directions in two adjacent domain areas are different. Since the turning of liquid crystal molecules in a pixel in a liquid crystal display of vertical alignment mode is asymmetric, the left-right viewing angles of a liquid crystal display panel in the related art have a significant color deviation and a CR (80/20) level difference, i.e., a large difference between the front view and the side view, affecting the optical performance.

Figure 2:
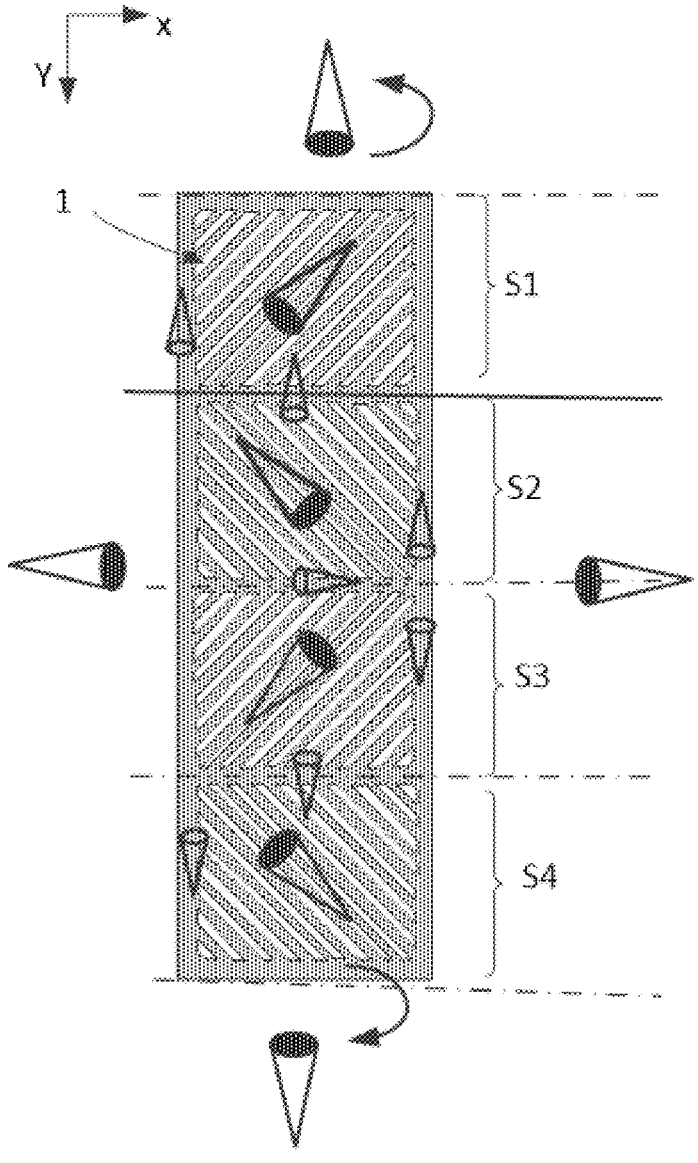
FIG. 2 illustrates a schematic diagram of the turning of liquid crystal molecules in each domain area in a pixel unit of a vertically aligned display panel in the related art.

FIG. 1 illustrates a schematic diagram of a slit tilt direction and an alignment force direction in a sub-pixel in a pixel unit of a vertically aligned display panel in the related art. In FIG. 1, taking the pixel unit on the array substrate as a slit electrode as an example, a pixel is divided into four domain areas, which sequentially are a first domain area S1, a second domain area S2, a third domain area S3, and a fourth domain area S4. The tilt direction of the slit 1 in each domain area is shown in FIG. 1(a). Here, it should be noted that the tilt direction of the slit 1 means that the four domain areas are arranged sequentially along a first direction Y, and the tilt direction of the slit 1 means the tilt direction of the slit 1 with respect to a second direction X which intersects with the first direction Y, for example, the second direction X is perpendicular to the first direction Y. The alignment force direction of the alignment film on the common electrode of the color film substrate to the liquid crystal molecules in each domain area is shown by the dotted arrow in FIG. 1(b). A schematic diagram of the extension direction of the slit 1 and the alignment force direction of the alignment film in the liquid crystal display panel after the array substrate and the color film substrate are attached is shown in FIG. 1(c). The alignment azimuth angle of the liquid crystal molecules in each domain area is shown in FIG. 1(d). The turning of the liquid crystal molecules in the domain area and the surrounding liquid crystal molecules is schematically shown in FIG. 2. Specifically, the alignment of the liquid crystal molecules is such that the head of the liquid crystal molecules points in the direction of the tail. The head of the liquid crystal molecules refers to the bottom face of the cone shown in the figure, and the tail of the liquid crystal molecules refers to the top of the cone shown in the figure. It can be seen from the figure that the pouring state of the liquid crystal molecules in the pixel domain is asymmetric, and the rotation directions of the liquid crystal molecules in the first domain area and the fourth domain area are asymmetric with the periphery. The boundary of the first domain area rotates counterclockwise, and the boundary of the second domain area rotates clockwise. The rotation angle difference at the boundary may affect the left-right viewing angle color deviation state.

The inventors have found that, in the liquid crystal display device in the related art, the tilt directions of the polarizer and the slit are both 45°, resulting in poor left-right viewing angle color deviation due to asymmetric alignment directions of liquid crystal molecules within the same pixel. In order to improve the above-mentioned problems, embodiments of the present disclosure provide a pixel unit, a display substrate, a display panel, and a display device, which can improve the color cast of the display device.

Figure 3:
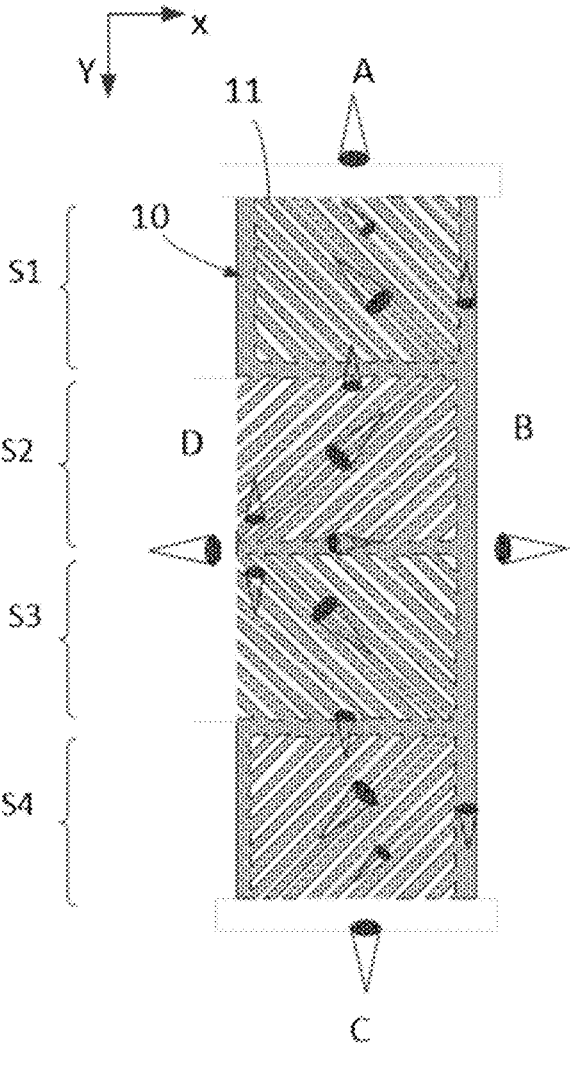
FIG. 3 illustrates a schematic diagram of the turning of liquid crystal molecules in each domain area in a sub-pixel in the pixel unit provided in an embodiment of the present disclosure.

FIG. 3 illustrates a structural schematic diagram of a pixel unit provided in an embodiment of the present disclosure.

With reference to FIG. 3, the pixel unit provided by an embodiment of the present disclosure includes a slit electrode 10 having a slit 11, the pixel unit includes at least two sub-pixels corresponding to different colors, each of the pixels includes n domain areas arranged along a first direction Y, n is a positive integer greater than or equal to 2, the slit 11 extension directions of the slit electrodes 10 in any two adjacent domain areas in the n domain areas of the pixel unit are different, an acute angle between an extension direction of the slit 11 in each domain area and a second direction X is a predetermined angle, the predetermined angle is greater than or equal to 30° and less than 45°, and the second direction X intersects with the first direction Y.

It should be noted that the second direction X is an extension direction of an intersection line between two adjacent domain areas, and intersects with the first direction Y. Illustratively, the second direction X is perpendicular to the first direction Y.

In the above-mentioned solution, the predetermined angle between the slit 11 extension direction in each domain area and the second direction X is the tilt angle of the slits 11, and the tilt angle of the slits 11 in each domain area is designed to be greater than or equal to 30° and less than 45°, so that the acute angle between the alignment direction of the liquid crystal molecules in each domain area and the second direction X is reduced, and the color deviation phenomenon can be improved compared with the related art in which the tilt angle of the slits 11 is designed to be 45°.

A schematic diagram of the turning of liquid crystal molecules in each domain area in a pixel unit provided in an embodiment of the present disclosure is shown in FIG. 3.

The following explains the verification result of the technical effect of improving the color deviation phenomenon that the pixel unit provided in the embodiment of the present disclosure designs the tilt angle of the slit 11 to be greater than or equal to 30° and less than 45°, compared with the related art in which the tilt angle of the slit 11 is 45°.

A liquid crystal display panel of the related art as a comparative example, and a liquid crystal display panel using the pixel unit provided in the present disclosure as an experimental example, the above-mentioned technical effects of the pixel unit provided in the embodiments of the present disclosure are verified. The tilt angle of the slit 11 of the slit electrode 10 in the liquid crystal display panel in comparative example 1 is 45°, and the alignment force direction of the Wire Grid Polarizer (WGP) used in the liquid crystal display panel is 45°, so that the alignment azimuth angle of the liquid crystal molecules in the domain area is 45°. The alignment azimuth angle of the liquid crystal molecules in the domain area in comparative example 2 is 50. The alignment azimuth angle of the liquid crystal molecules in the pixel unit in embodiment 1 of the present disclosure is 40°.

Figure 6:
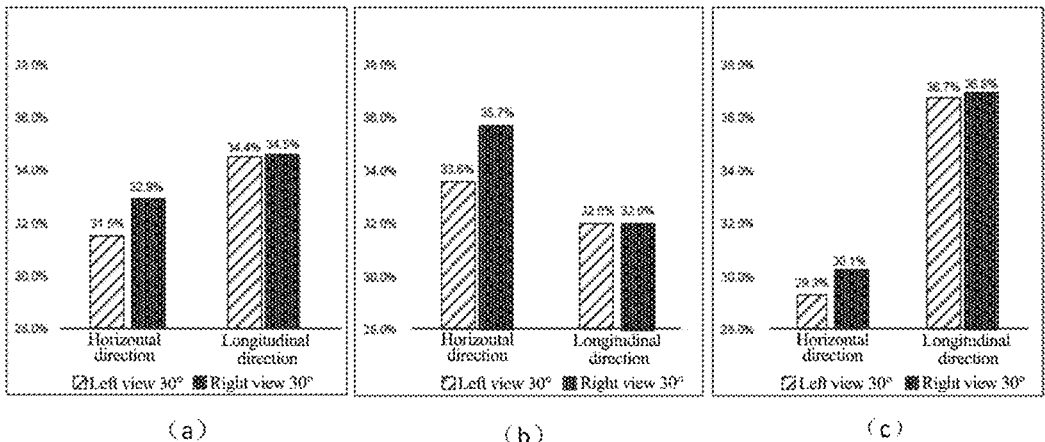
FIG. 6 shows a schematic diagram of test results of performing CR (80/20) simulation tests on the liquid crystal display panels of comparative example 1, comparative example 2, and embodiment 1.

The liquid crystal display panels of comparative example 1, comparative example 2 and embodiment 1 are subjected to CR (80/20) simulation test, and the test results are shown in FIG. 6, in which FIG. 6(a) is a structural schematic diagram of the test of comparative example 1, FIG. 6(b) is a structural schematic diagram of the test of embodiment 1, and FIG. 6(c) is a structural schematic diagram of the test of comparative example 2. According to the test results shown in FIG. 6, as the alignment azimuth angle of the liquid crystal declines from 45° to the second direction X (<45°), the left-right viewing angle color deviation improves and the up-down viewing angle color deviation deterioration. When the azimuth angle declines from 45° to the first direction Y (>) 45°, the left-right viewing angle color deviation deterioration and the up-down viewing angle color cast can be improved. The corresponding relationship between the magnitude of the azimuth angle of the liquid crystal molecule and the color deviation CR (80/20) is shown in FIG. 6. It can thus be verified that when the tilt angle (the predetermined angle) of the slit 11 is designed to be greater than or equal to 30° and less than 45° in the pixel unit provided by the embodiment of the present disclosure, the left-right viewing angle color deviation can be improved.

It should be noted that other embodiments in which the predetermined angle is between 30° and 45° are not listed here due to space limitations. But it should be understood that, when the predetermined angle is between 30° and 45°, the left-right viewing angle color deviation can be improved.

Furthermore, preferably, the predetermined angle may be greater than or equal to 35° and less than 45°. At this time, the effect of improving the left-right viewing angle color deviation of the liquid crystal display panel to which the pixel unit of the present disclosure is applied is more obvious.

Figure 5:
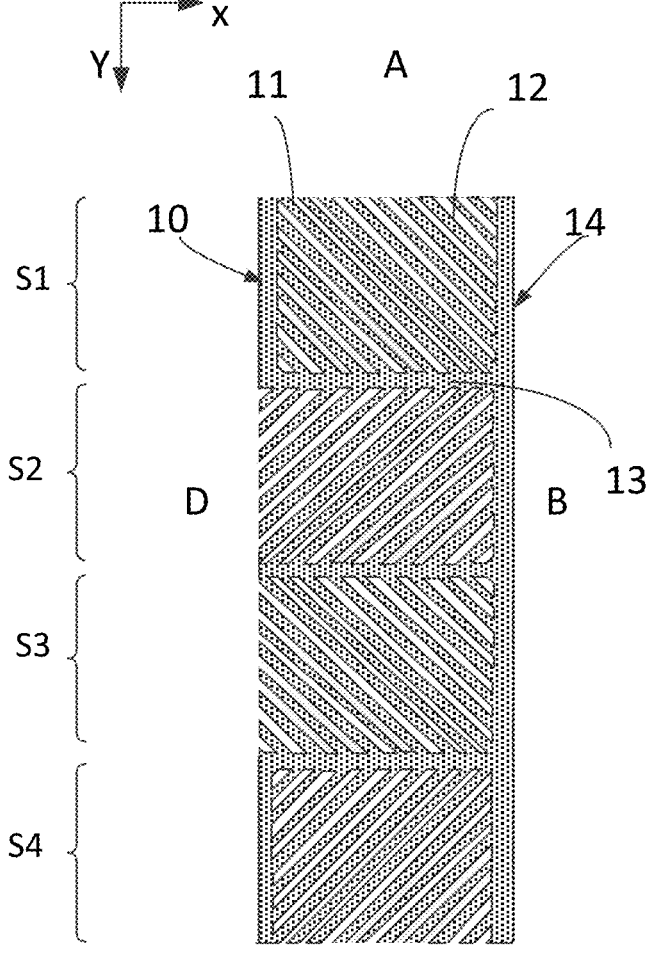
FIG. 5 illustrates a schematic diagram of a slit structure in each domain area of a sub-pixel in a pixel unit provided in an embodiment of the present disclosure.

Furthermore, as shown in FIG. 5, in some embodiments, the slit electrode 10 includes a plurality of branch electrodes 12 arranged parallel to each other and spaced apart in each domain area, an inter-domain main electrode 13 extending along the second direction X is provided between two adjacent domain areas, and the branch electrodes 12 in two adjacent domain areas are in mirror symmetry with respect to the inter-domain main electrode 13.

In the related art, the slit electrode 10 further includes a domain boundary main electrode 14 at the domain area and located in the periphery of the branch electrode 12. As shown in FIG. 5, the domain boundary main electrode 14 surrounds the peripheral sides of the plurality of branch electrodes 12 as the boundary of the slit electrode 10. That is, the plurality of branch electrodes 12 do not extend to the boundary of the slit electrode 10, but have a certain distance from the boundary, for example, 5.5 micrometers or the like from the boundary.

The inventors have found that in the display panel, the liquid crystal molecules located in the domain area are in a stable state, and the deflection angle of the liquid crystal molecules can be controlled by adjusting the magnitude of the electric field force so as to control the display brightness; however, the liquid crystal molecules between the domain areas and at the domain boundaries are in an unstable state, and the liquid crystal molecules between the domain areas and at the domain boundaries usually show dark lines, and the wider the electrode at the domain boundary, the lower the transmittance of the display panel. A pixel structure in a display panel in the related art shown in the figure is taken as an example. The dark lines are shown as thick solid lines in the figure.

In order to further improve the difference of the left-right viewing angle color deviation and improve the transmittance, in some exemplary embodiments, as shown in FIG. 5, each domain area includes a first side A and a second side C opposite to each other in the first direction Y, and a plurality of domain areas include a first domain area S1, a second domain area S2 . . . and an nth domain area arranged sequentially from the first side A to the second side C; a slit 11 of the first domain area S1 extends to and communicates with the boundary of the first side A, so that the boundary of the first side A forms a non-closed structure in which a plurality of the slits 11 and a plurality of the branch electrodes 12 are interleaved; and the slit 11 of the nth domain area extends to and communicates with the boundary of the second side C, so that the boundary of the second side C forms a non-closed structure in which a plurality of the slits 11 and a plurality of the branch electrodes 12 are interleaved.

In order to explain the above-mentioned solution more clearly, taking the orientation shown in FIG. 5 as an example, the slit 11 of the first domain area S1 located at the uppermost position communicates with the upper boundary of the pixel electrode, in other words, the upper boundary is not provided with the domain boundary main electrode 14; likewise, the slit 11 of the nth domain area (i.e., the fourth domain area S4 in FIG. 5) located at the lowermost position communicates with the lower boundary of the pixel electrode, in other words, the lower boundary is not provided with the domain boundary main electrode 14; in this way, the liquid crystal molecules at the intersection of the first domain area S1 and the nth domain area with the upper and lower boundaries of the pixel can be made more stable under the action of the electric field force. Thus, it is possible to further reduce the difference of left-right viewing angle color deviation.

Some liquid crystal display panels of the related art as a comparative example, and a liquid crystal display panel applying the pixel unit provided in the present disclosure as an experimental example, the above-mentioned technical effects of the pixel unit provided in the embodiments of the present disclosure are verified. The upper and lower boundaries of the pixel electrode in the liquid crystal display panel in comparative example 3 both have a domain boundary main electrode 14, and the tilt angle of the slit 11 is 45°. In embodiment 3, the slit 11 of the first domain area S1 of the pixel electrode in the liquid crystal display panel applying the pixel unit provided in the embodiment of the present disclosure is connected to the upper boundary (i.e., the upper boundary does not have the domain boundary main electrode 14) and the slit 11 of the nth domain is connected to the lower boundary (i.e., the lower boundary does not have the domain boundary main electrode 14), and the tilt angle of the slit 11 is 45°. In embodiment 4, the slit 11 of the first domain area S1 of the pixel electrode in the liquid crystal display panel applying the pixel unit provided in the embodiment of the present disclosure is connected to the upper boundary (i.e., the upper boundary does not have the domain boundary main electrode 14) and the slit 11 of the nth domain is connected to the lower boundary (i.e., the lower boundary does not have the domain boundary main electrode 14), and the tilt angle of the slit 11 is 40°.

Figure 7:
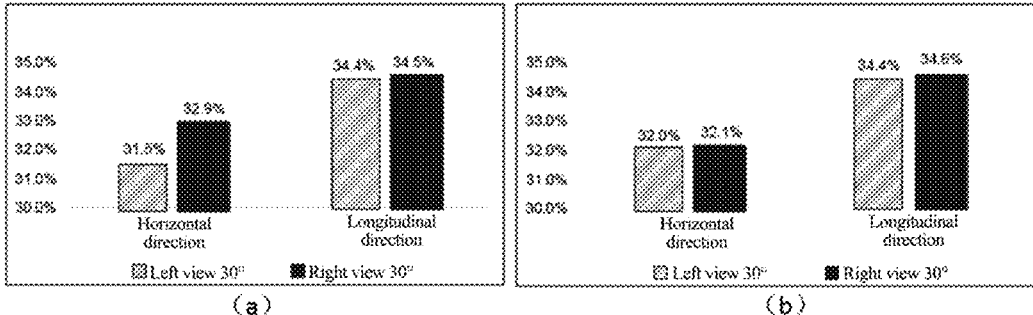
FIG. 7 shows a schematic diagram of test results of performing CR (80/20) simulation tests on the liquid crystal display panels of the above-mentioned comparative example 3 and embodiment 3.
Figure 8:
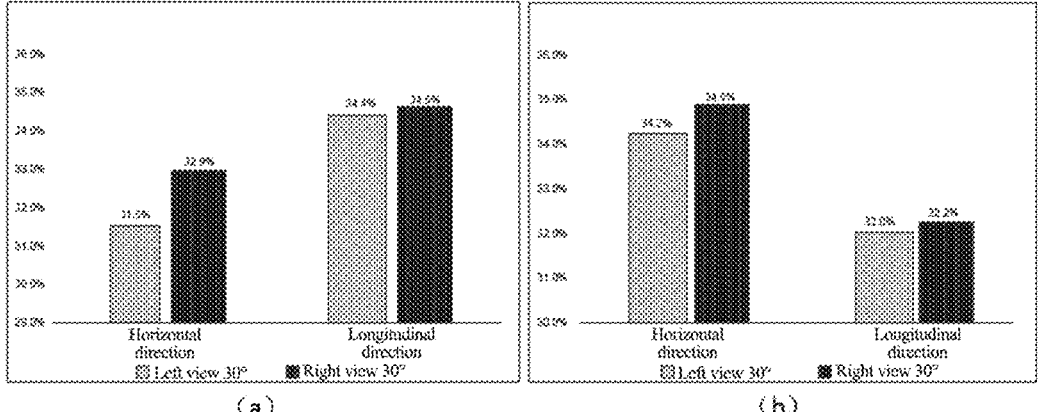
FIG. 8 shows a schematic diagram of test results of performing CR (80/20) simulation tests on the liquid crystal display panels of the above-mentioned comparative example 3 and embodiment 4.

The liquid crystal display panels in comparative example 3 and embodiment 3 are subjected to a CR (80/20) simulation test, and the test results are shown in FIG. 7. FIG. 7(a) shows the test result of comparative example 3, and FIG. 7(b) shows the test result of embodiment 2. The liquid crystal display panels in comparative example 3 and embodiment 4 are subjected to a CR (80/20) simulation test, and the test results are shown in FIG. 8. It can be seen from the test results of FIGS. 7 and 8 that when the tilt angle of the slit 11 is optimized to 40°, and the slit 11 of the first domain area S1 extends to the boundary of the first side A, and the slit 11 of the nth domain area extends to the boundary of the second side C, the left-right viewing angle color deviation CR (80/20) of the liquid crystal display panel is improved, and at the same time, the difference of the left-right viewing angle color deviation decreases.

It should be noted that, in the above embodiments, the slit 11 of the first domain area S1 extends to the boundary of the first side A while the slit 11 of the second domain area S2 extends to the boundary of the second side C, however, in other embodiments not shown, only the slit 11 of the first domain area S1 may extend to the boundary of the first side A, or only the slit 11 of the second domain area S2 may extend to the boundary of the second side C.

Furthermore, in order to further improve the low transmittance of the display panel in the related art, in the embodiments of the present disclosure, illustratively, each domain area includes a third side and a fourth side opposite to each other in the second direction X, and a plurality of domain areas include the first domain area S1, the second domain area S2 . . . an mth domain area . . . and the nth domain area arranged sequentially from the first side A to the second side C, m is a positive integer greater than 1 and less than n, wherein at least one slit 11 of the mth domains extends to a boundary of the third side such that the boundary of the second side C forms the non-closed structure in which a plurality of the slits 11 and a plurality of the branch electrodes 12 are interleaved, and the third side is a side of the mth domain area forming a dark line.

In the above-mentioned solution, the third side is a side of the mth domain area forming a dark line, and the slit 11 of the mth domain area extends to the boundary of the third side, so that the dark line can be pushed to the outside of the domain area to make the liquid crystal molecules at the mth domain area more stable, thereby effectively improving the color deviation and improving the transmittance.

It should be noted that the above-mentioned mth domain area refers to any domain area located between the first domain area S1 and the nth domain area. In some embodiments, the slits 11 of the domain areas other than the first domain area S1 and the nth domain area may extend to the boundary of the third side. For example, taking the embodiment shown in FIG. 5 as an example, the slits 11 of the second domain area S2 and the third domain area of the four domain areas both extend to the third side boundary (the left side boundary in the orientation shown in the figure is the third side boundary).

For example, taking the division of a pixel into four domain areas in the pixel unit shown in FIG. 5 as an example, the slit 11 of the first domain area S1 extends to the upper boundary, and the slit 11 of the fourth domain area S4 extends to the lower boundary. The liquid crystal molecule alignment directions of the second domain area S2 and the third domain area S3 are as shown in FIG. 5 as an example, it can be determined that a dark line will appear at the left boundary shown in FIG. 5 according to the liquid crystal molecule alignment directions, and therefore the slits 11 of the second domain area S2 and the third domain area S3 can both extend to the left boundary.

It should be understood that, the illustration in FIG. 5 is only an example, and in practical application, the third side boundary is determined by the liquid crystal molecule alignment direction and is not limited to the embodiment illustrated in FIG. 5.

Furthermore, in some exemplary embodiments, at least one slit 11 of the mth domain area extends to a boundary of the fourth side such that the boundary of the second side C forms the non-closed structure in which a plurality of the slits 11 and a plurality of the branch electrodes 12 are interleaved. In the above-mentioned solution, the boundary of the fourth side of the mth domain area may also be designed such that the slit 11 extends to the boundary.

Of course, in some other exemplary embodiments, as shown in FIG. 5, at least one of the mth domain areas has the domain boundary main electrode 14 extending along the first direction Y at the boundary of the fourth side. In the above-mentioned solution, since there is no dark line at the fourth side of the mth domain area, the domain boundary main electrode 14 may be provided at the boundary of the fourth side.

Furthermore, in the pixel unit provided in the embodiment of the present disclosure, the slit electrode 10 is at least one of a pixel electrode and a common electrode. In other words, the slit 11 may be provided on the pixel electrode, may be provided on the common electrode, and may be provided in combination with the pixel electrode and the common electrode.

The pixel electrode may be provided on an array substrate, and the common electrode may be provided on a color film substrate. With reference to FIGS. 11 to 18, specifically, in some embodiments, the pixel electrode is the slit electrode 10 which is provided with the slits 11 in each domain area, and the common electrode may not be provided with slits 11 in each domain area.

In some other embodiments, the pixel electrode and the common electrode are combined as the slit electrode 10, taking the number of domain areas as four as an example, the pixel electrode is provided with the slits 11 in the first domain area S1 and the second domain area S2, and the common electrode is provided with the slits 11 in the third domain area S3 and the fourth domain area S4. After the array substrate and the color film substrate are aligned, the pixel electrode and the common electrode are combined, so that the slits 11 are provided in each domain area.

In some other embodiments, the pixel electrode and the common electrode are combined as the slit electrode 10, taking the number of domain areas as four as an example, the pixel electrode is provided with the slits 11 in the third domain area S3 and the fourth domain area S4, and the common electrode is provided with the slits 11 in the first domain area S1 and the second domain area S2. After the array substrate and the color film substrate are aligned, the pixel electrode and the common electrode are combined, so that the slits 11 are provided in each domain area.

In some other embodiments, the pixel electrode and the common electrode are combined as the slit electrode 10, taking the number of domain areas as four as an example, the pixel electrode is provided with the slits 11 in the first domain area S1 and the third domain area S3, and the common electrode is provided with the slits 11 in the second domain area S2 and the fourth domain area S4. After the array substrate and the color film substrate are aligned, the pixel electrode and the common electrode are combined, so that the slits 11 are provided in each domain area.

In some other embodiments, the pixel electrode and the common electrode are combined as the slit electrode 10, taking the number of domain areas as four as an example, the pixel electrode is provided with the slits 11 in the second domain area S2 and the fourth domain area S4, and the common electrode is provided with the slits 11 in the first domain area S1 and the third domain area S3. After the array substrate and the color film substrate are aligned, the pixel electrode and the common electrode are combined, so that the slits 11 are provided in each domain area.

In some other embodiments, the pixel electrode and the common electrode are combined as the slit electrode 10, taking the number of domain areas as four as an example, the pixel electrode is provided with the slits 11 in the first domain area S1 and the fourth domain area S4, and the common electrode is provided with the slits 11 in the second domain area S2 and the third domain area S3. After the array substrate and the color film substrate are aligned, the pixel electrode and the common electrode are combined, so that the slits 11 are provided in each domain area.

In some other embodiments, the pixel electrode and the common electrode are combined as the slit electrode 10, taking the number of domain areas as four as an example, the pixel electrode is provided with the slits 11 in the second domain area S2 and the third domain area S3, and the common electrode is provided with the slits 11 in the first domain area S1 and the fourth domain area S4. After the array substrate and the color film substrate are aligned, the pixel electrode and the common electrode are combined, so that the slits 11 are provided in each domain area.

In some other embodiments, the common electrode is the slit electrode 10, which is provided with the slits 11 in each domain area, and the pixel electrode may not be provided with slits 11 in each domain area.

It should be noted that the above are only some examples, and in practical application, the arrangement of the slits 11 on the pixel electrode and the common electrode is not limited thereto, and will not be listed herein.

Furthermore, it should be noted that the tilt direction of the slit 11 in the pixel illustrated in FIGS. 11 to 18 is merely an example, and in some other embodiments, as shown in FIGS. 19 to 26, the tilt direction of the slit 11 and the tilt direction of the slit 11 shown in FIGS. 11 to 18 may also be in mirror symmetry with respect to the first direction Y.

Furthermore, embodiments of the present disclosure also provide a display substrate for forming a liquid crystal display panel aligned with another substrate; the liquid crystal display panel includes a pixel unit provided by an embodiment of the present disclosure, the display substrate includes a first electrode, the another substrate includes a second electrode, and at least one of the first electrode and the second electrode corresponding to each domain area has the slit 11.

In the above-mentioned solution, the display substrate may be an array substrate, the first electrode is a pixel electrode, the another substrate may be a color film substrate, and the second electrode is a common electrode. Alternatively, the display substrate may be a color film substrate, the first electrode may be a common electrode, the another substrate may be an array substrate, and the second electrode may be a pixel electrode.

Furthermore, embodiments of the present disclosure also provide a display panel including:

a display substrate provided by an embodiment of the present disclosure, where the display substrate is at least one of the array substrate and the color film substrate, and the array substrate includes a first substrate, a first alignment film located on the first substrate, and a pixel electrode located on a side of the first alignment film away from the first substrate;

the color film substrate includes a second substrate, a second alignment film located on the second substrate, and a common electrode located on a side of the second alignment film away from the second substrate;

and a liquid crystal molecule located between the array substrate and the color film substrate;

At least one of the pixel electrode of the array substrate and the common electrode of the color film substrate is a slit electrode 10 having a slit 11. The pixel unit includes at least two sub-pixels corresponding to different colors, each of the pixels includes n domain areas arranged along a first direction Y, and n is a positive integer greater than or equal to 2.

The slits 11 extension directions of the slit electrodes 10 in any two adjacent domain areas in the n domain areas of the pixel unit are different, an acute angle between an extension direction of the slit 11 in each domain area and a second direction X is a predetermined angle. The predetermined angle is greater than or equal to 30° and less than 45°, and the second direction intersects with the first direction. The alignment force of the first alignment film and/or the second alignment film is used to cause the liquid crystal molecules to have different predetermined tilt angles in each domain area.

It should be noted that the second direction X is an extension direction of an intersection line between two adjacent domain areas, and intersects with the first direction Y. Illustratively, the second direction X is perpendicular to the first direction Y.

In the above-mentioned solution, the predetermined angle between the slit 11 extension direction in each domain area and the second direction X is the tilt angle of the slits 11, and the tilt angle of the slits 11 in each domain area is designed to be greater than or equal to 30° and less than 45°, so that the acute angle between the alignment angle of the liquid crystal molecules in each domain area and the second direction X is reduced, and the color deviation phenomenon can be improved compared with the related art in which the tilt angle of the slits 11 is designed to be 45°.

Illustratively, the predetermined tilt angles of the liquid crystal molecules in the different domain areas are different and the liquid crystal molecules in two adjacent domain areas are not in mirror symmetry with respect to the second direction X. Taking the example shown in FIG. 5, the pixel unit is divided into four domain areas, being a first domain area S1, a second domain area S2, a third domain area S3, and a fourth domain area S4. The alignment azimuth angle of the liquid crystal molecules in the first domain area S1 is 315°, the alignment azimuth angle of the liquid crystal molecules in the second domain area is 45°, the alignment azimuth angle of the liquid crystal molecules in the third domain area is 225°, and the alignment azimuth angle of the liquid crystal molecules in the fourth domain area 104 is 135°. Specifically, the orientation of the liquid crystal molecules is such that the head of the liquid crystal molecules points in the direction of the tail. The head of the liquid crystal molecules refers to the bottom face of the cone shown in FIG. 5, and the tail of the liquid crystal molecules refers to the top of the cone shown in FIG. 5.

It should be noted that, in the present application, the alignment azimuth angle of the liquid crystal molecules refers to the angle between the orientation of the liquid crystal molecules and the second direction X along the counterclockwise direction, and the alignment azimuth angle of the liquid crystal molecules indicates the direction of the orientation force to which the liquid crystal molecules are subjected.

Illustratively, an angle between an alignment direction of the first alignment film and/or the second alignment film in each domain area and an extension direction of the slit 11 in this domain area is less than or equal to a predetermined angle, illustratively, the predetermined angle is 0° to 15°. In other words, the alignment direction of the first alignment film and/or the second alignment film in each domain area is substantially parallel to the extension direction of the slit 11 in this domain area.

Preferably, the predetermined angle is 0°, in other words, the alignment direction of the first alignment film and/or the second alignment film in each domain area is parallel to the extension direction of the slit 11 in this domain area. At this time, the alignment azimuth angle of the liquid crystal molecules is more easily determined, and the accuracy is more easily controlled by applying a voltage.

The display panel provided by the embodiments of the present disclosure may be a vertically aligned display panel. It will be understood, however, that the invention is not limited to vertically aligned display panels.

In addition, in the display panel provided by the embodiments of the present disclosure, taking the exposure treatment of the first orientation layer or the second orientation layer as an example, the display panel may be an array substrate exposure or a color film substrate exposure. The slit 11 is provided on a pixel electrode of the array substrate or a common electrode of the color film substrate, and the angle between the slit 11 extension direction and the second direction X is between 40° and 45°. The declining direction of the liquid crystal molecules after the color film substrate and the array substrate are attached may be parallel to the slit 11 extension direction, i.e., the alignment force direction of the color film substrate or the array substrate can be consistent with the slit 11 extension direction.

Figure 4:
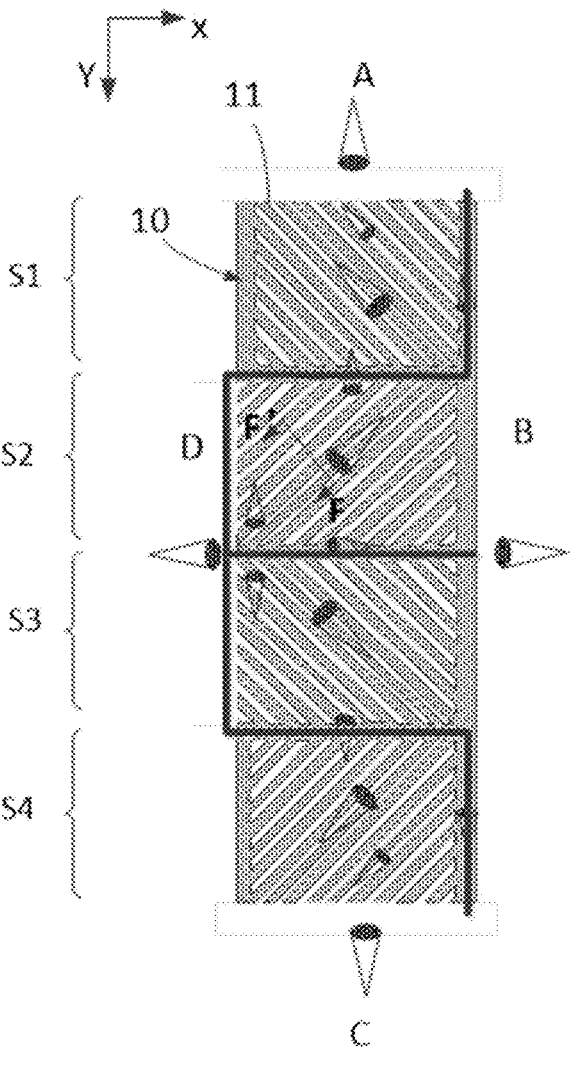
FIG. 4 illustrates a schematic diagram of a dark line in a sub-pixel in a pixel unit provided in an embodiment of the present disclosure.
Figure 9:
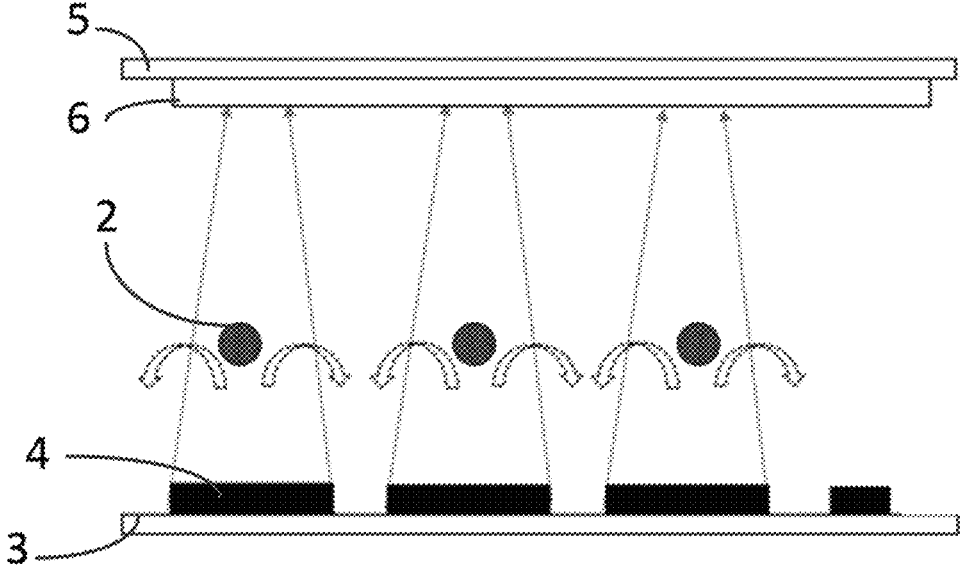
FIG. 9 shows a schematic diagram of the F-F' cross-sectional viewing angle of the electric field force of the second domain area S2 in the pixel unit of FIG. 4 in some embodiments.
Figure 10:
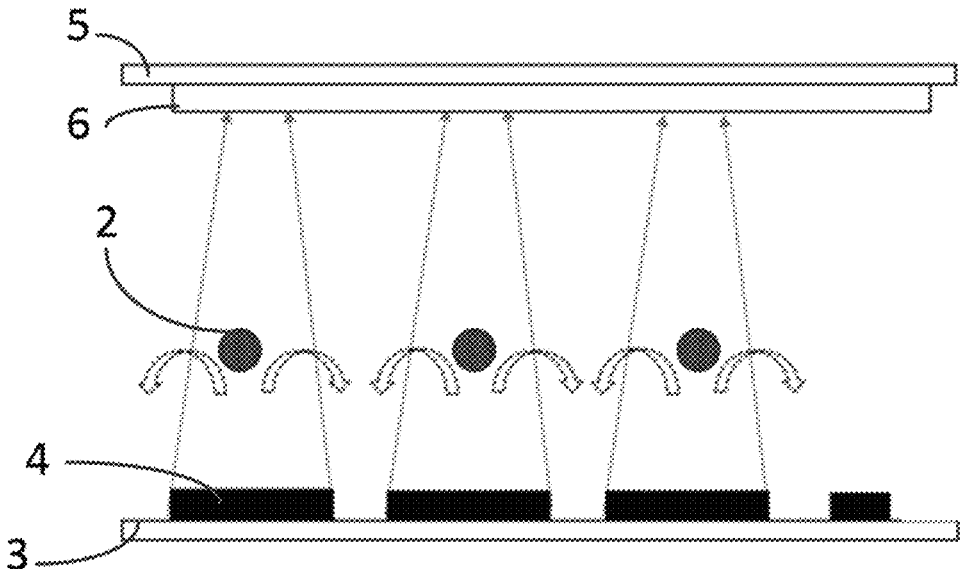
FIG. 10 shows a partial top view of FIG. 9.
Figure 11:
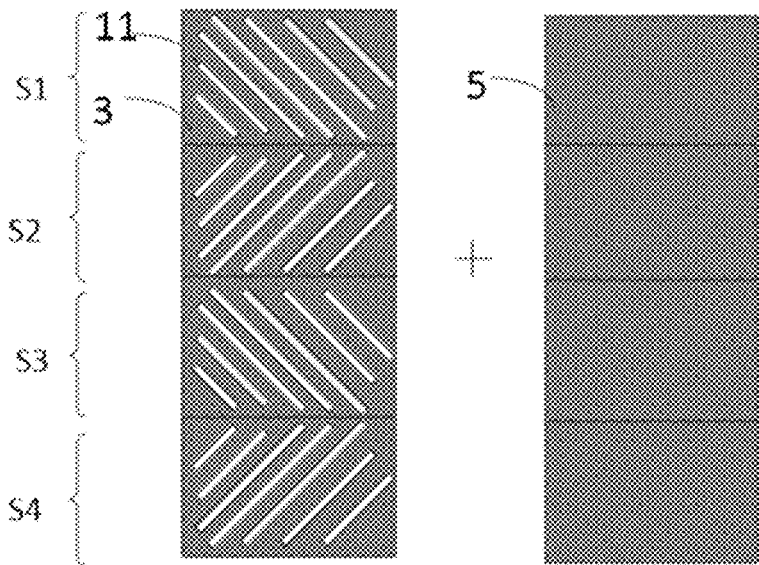
FIGS. 11-26 show schematic diagrams of embodiments in which the slit electrode is a combination of a pixel electrode on an array substrate and a common electrode on a color film substrate.
Figure 12:
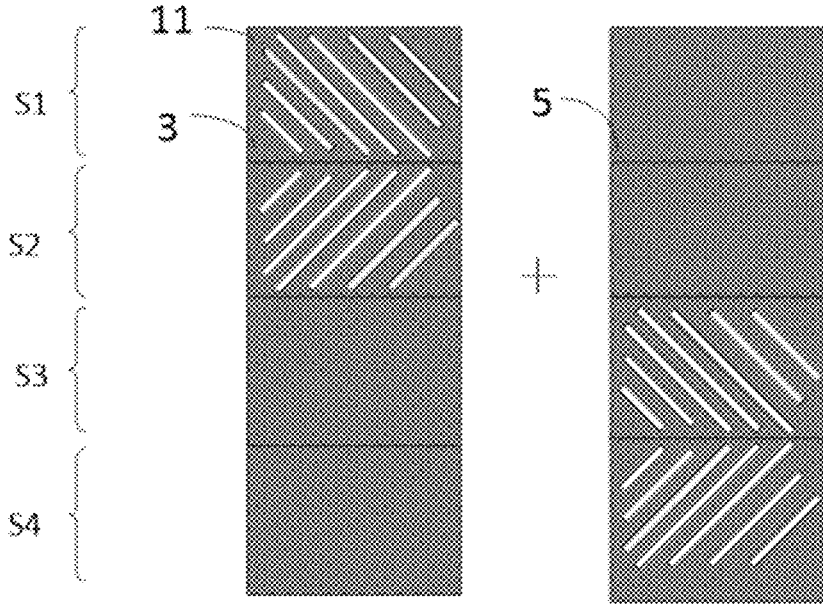
Figure 13:
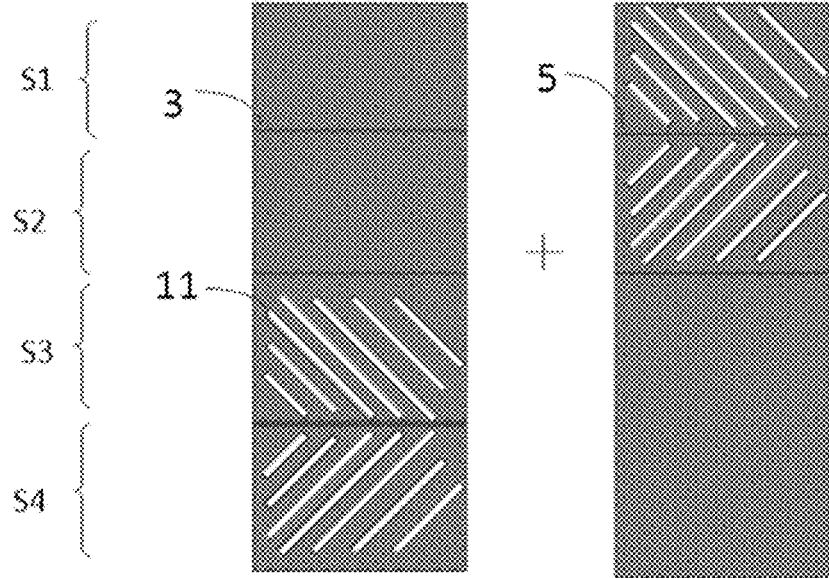
Figure 14:
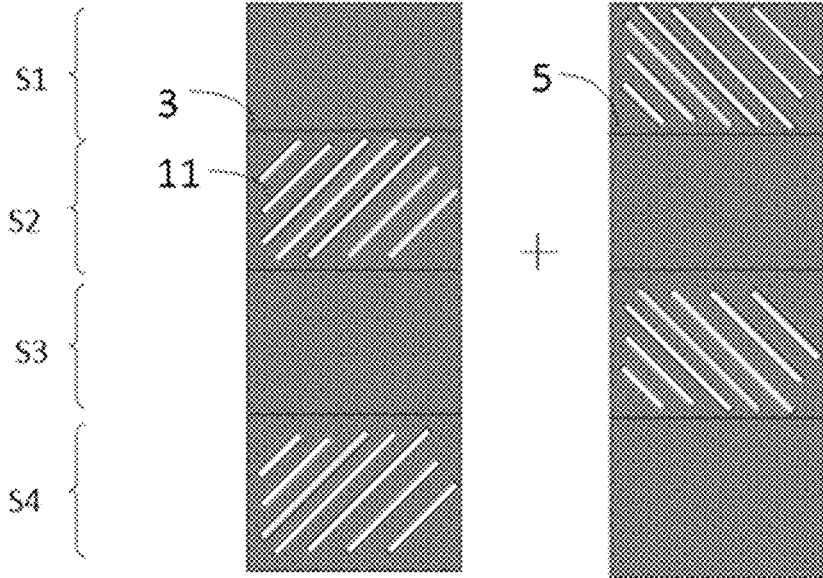
Figure 15:
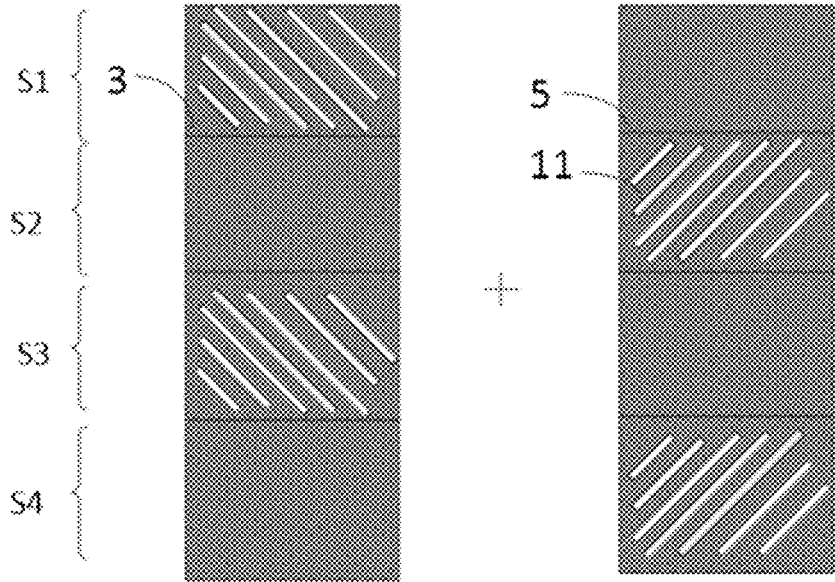
Figure 16:
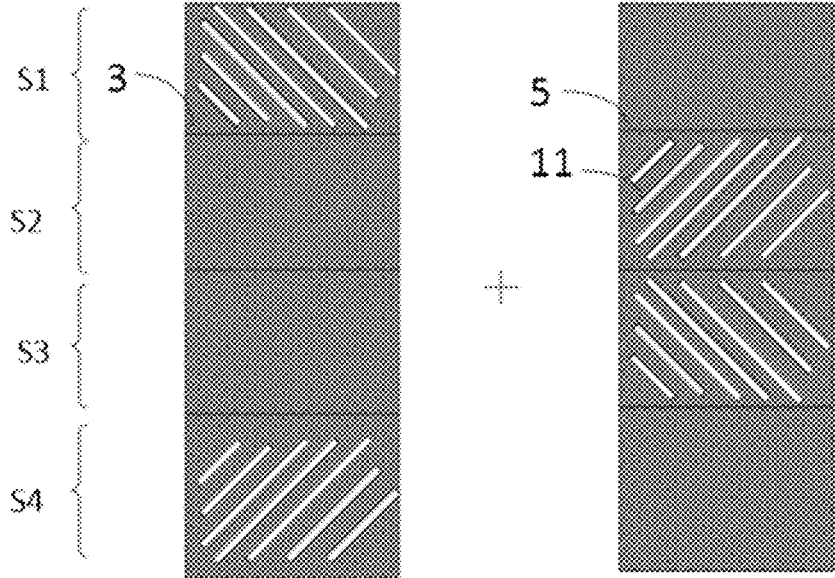
Figure 17:
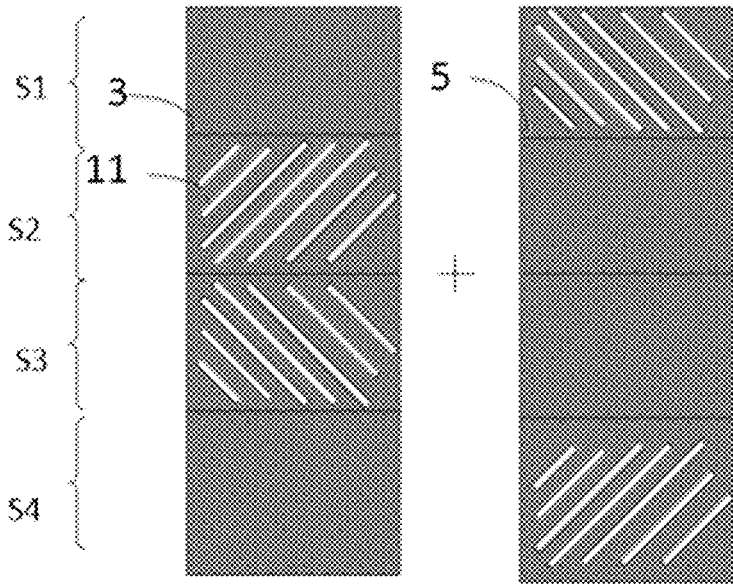
Figure 18:
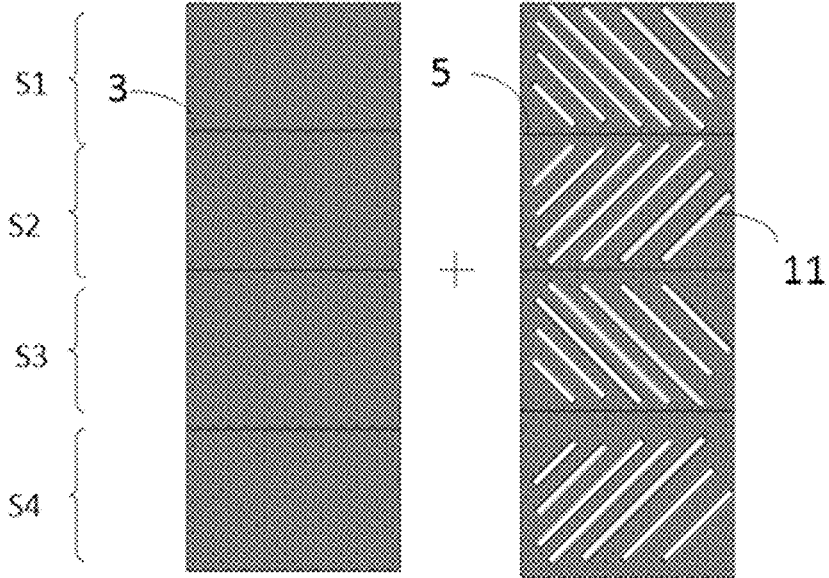
Figure 19:
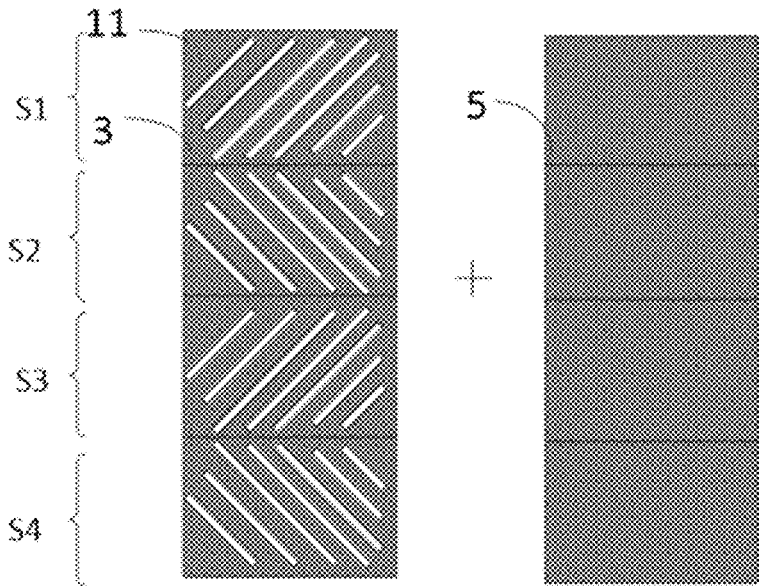
Figure 20:
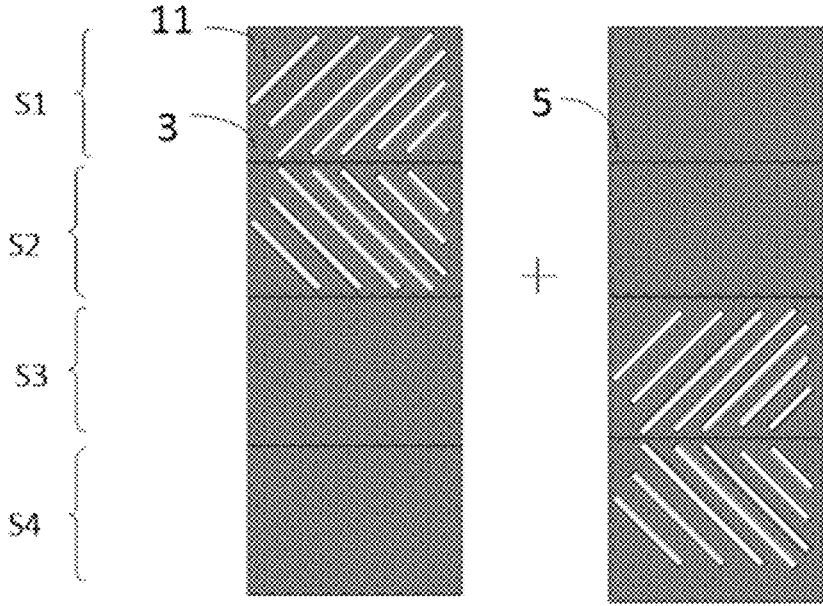
Figure 21:
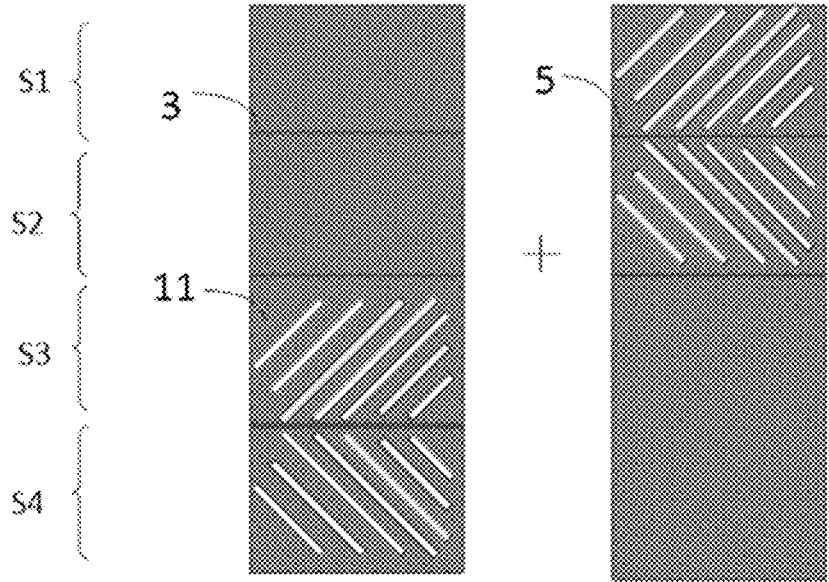
Figure 22:
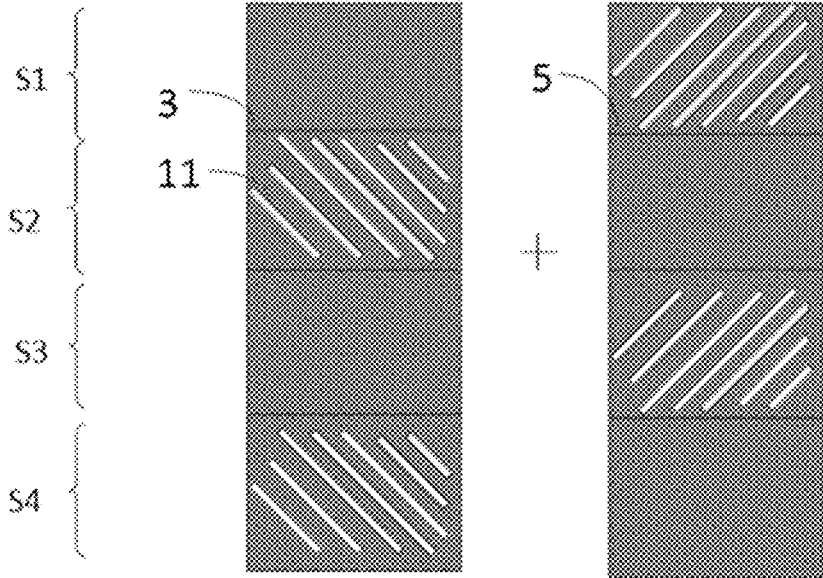
Figure 23:
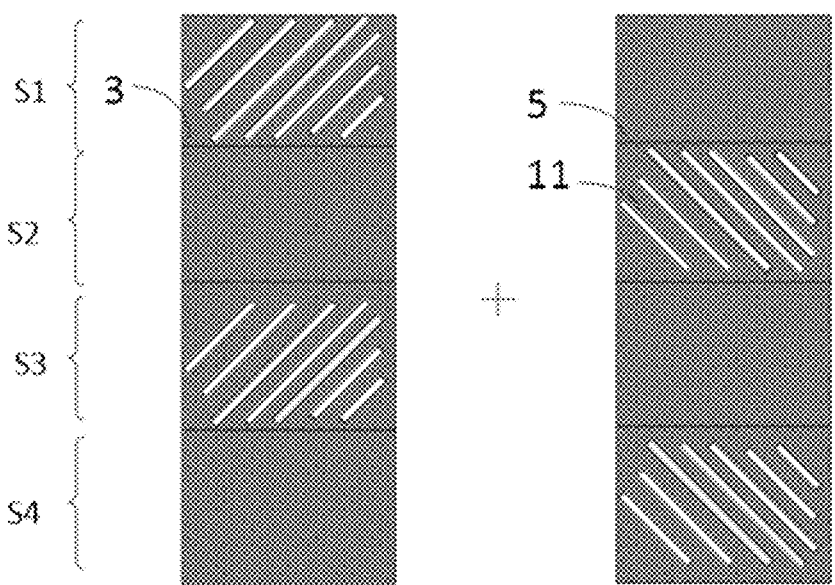
Figure 24:
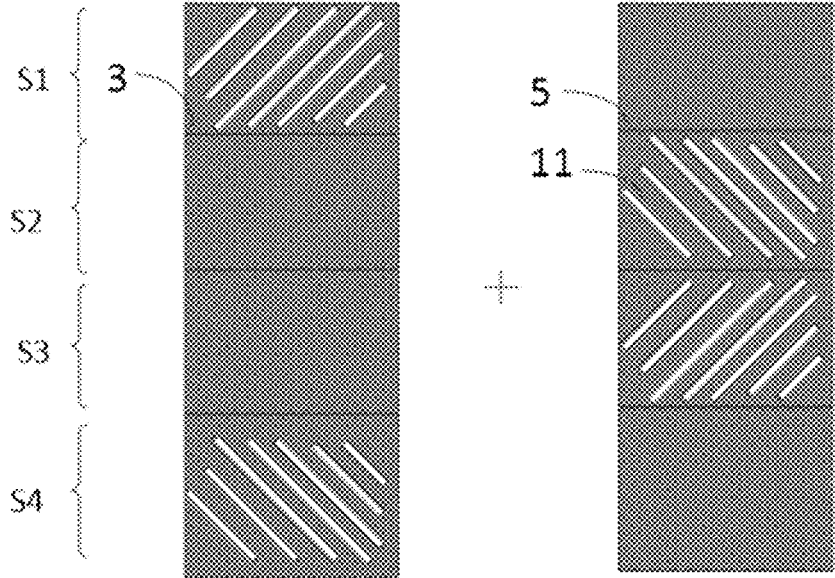
Figure 25:
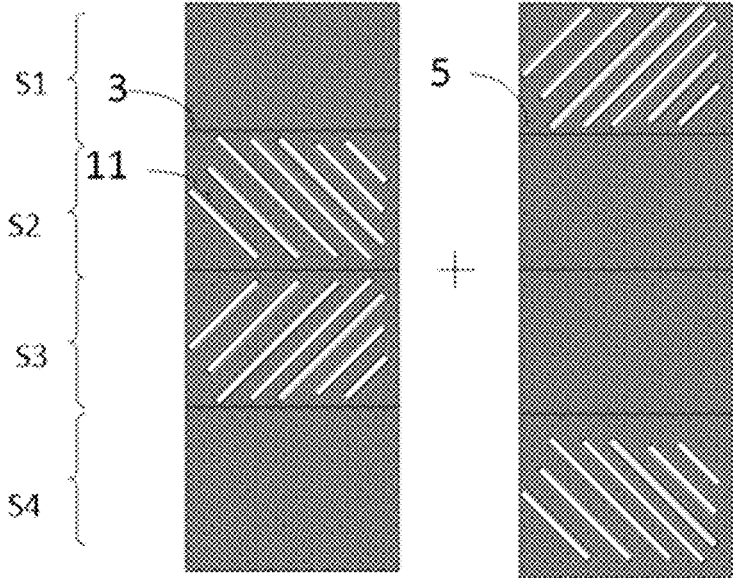
Figure 26:
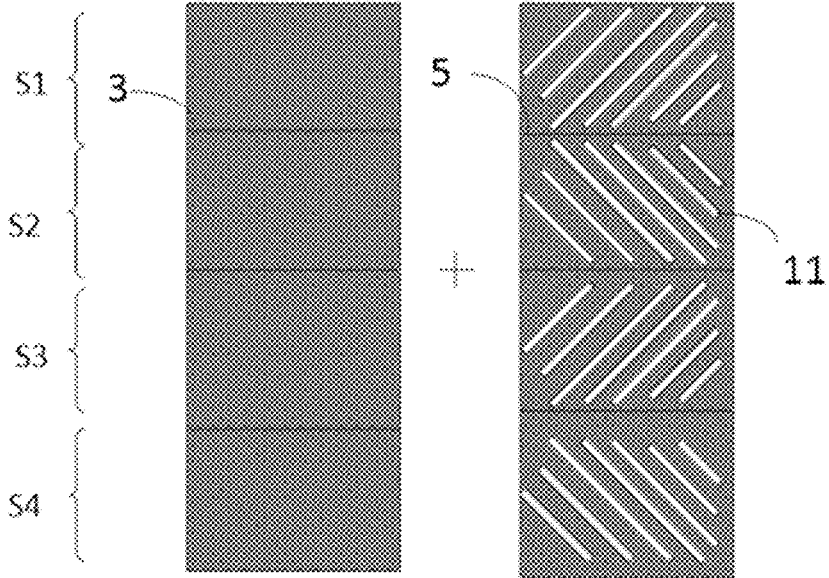

FIG. 8 illustrates a schematic diagram of an oblique view of an electric field force section of a third domain area S3 in a pixel unit according to some embodiments, and FIG. 9 is a top view of FIG. 8 in combination with a schematic diagram showing the turning of liquid crystal molecules in the third domain area S3 shown in FIG. 4. Taking the color film substrate 5 exposure as an example, the liquid crystal molecule 2 declines according to the direction of the alignment force. The pixel electrode 4 on the array substrate 3 serves as a slit electrode 10, and the liquid crystal molecule 2 completes azimuth angle rotation under the effect of the alignment force of the second orientation layer 6 on the color film substrate 5 and the electric field force of the slit 11 on the array substrate 3, and four domain area divisions are formed according to the azimuth angle rotation state of the liquid crystal molecules.

The following points need to be explained.

(1) The drawings relate only to the structures to which the embodiments of the present disclosure relate, and other structures may refer to general designs.

(2) In the drawings used to describe embodiments of the present disclosure, the thickness of layers or regions is exaggerated or reduced for clarity, i.e., the drawings are not to actual scale. It will be understood that when an element such as a layer, film, region, or substrate is referred to as being "on" or "under" another element, it can be "directly on" or "directly under" the other element or intermediate elements may be present.

(3) Without conflict, embodiments of the present disclosure and features of the embodiments may be combined with each other to provide new embodiments.

While the foregoing is directed to implementations of the present disclosure, the scope of the present disclosure is not limited thereto, and the scope of the present disclosure shall be subject to the scope of the claims in question.

What is claimed is:

1. A pixel unit, comprising slit electrodes each having a slit; wherein the pixel unit comprises at least two sub-pixels corresponding to different colors, each pixel comprises n domain areas arranged along a first direction, n is a positive integer greater than or equal to 2, extension directions of slits of the slit electrodes in any two adjacent domain areas in the n domain areas of the pixel unit are different, an acute angle between an extension direction of the slit in each domain area and a second direction is a predetermined angle, wherein the predetermined angle is greater than or equal to 35° and less than 45°, and the second direction intersects with the first direction;

wherein each slit electrode comprises a plurality of branch electrodes arranged parallel to each other and spaced apart in each domain area, an inter-domain main electrode extending along the second direction is provided between two adjacent domain areas, and the branch electrodes in two adjacent domain areas are in mirror symmetry with respect to the inter-domain main electrode;

wherein each domain area comprises a first side and a second side opposite to each other in the first direction, and the plurality of domain areas comprise a first domain area, a second domain area . . . and an nth domain area arranged sequentially from the first side to the second side, wherein a slit of the first domain area extends to a boundary of the first side such that the boundary of the first side forms a non-closed structure in which a plurality of the slits and a plurality of the branch electrodes are interleaved.

2. The pixel unit according to claim 1, wherein each domain area comprises a first side and a second side opposite to each other in the first direction, and the plurality of domain areas comprise a first domain area, a second domain area . . . and a nth domain area arranged sequentially from the first side to the second side, wherein a slit of the nth domain area extends to a boundary of the second side such that the boundary of the second side forms a non-closed structure in which a plurality of the slits and a plurality of the branch electrodes are interleaved.

3. The pixel unit according to claim 1, wherein each domain area comprises a third side and a fourth side opposite to each other in the second direction, and the plurality of domain areas comprise a first domain area, a second domain area . . . an mth domain area . . . and a nth domain area arranged sequentially from a first side to a second side, m is a positive integer greater than 1 and less than n, wherein at least one slit of the mth domain area extends to a boundary of the third side such that the boundary of the third side forms a non-closed structure in which a plurality of the slits and a plurality of the branch electrodes are interleaved, and the third side is a side of the mth domain area forming a dark line.

4. The pixel unit according to claim 3, wherein slits of the domain areas other than the first domain area and the nth domain area extend to the boundary of the third side.

5. The pixel unit according to claim 3, wherein at least one slit of the mth domain area extends to a boundary of the fourth side such that the boundary of the third side forms the non-closed structure in which a plurality of the slits and a plurality of the branch electrodes are interleaved;

alternatively, at least one of the mth domain areas has a domain boundary main electrode extending along the first direction at the boundary of the fourth side.

6. The pixel unit according to claim 1, wherein each slit electrode comprises at least one of a pixel electrode and a common electrode.

7. A display substrate for forming a liquid crystal display panel aligned with another substrate; wherein the liquid crystal display panel comprises a pixel unit comprising slit electrodes each having a slit; wherein the pixel unit comprises at least two sub-pixels corresponding to different colors, each pixel comprises n domain areas arranged along a first direction, n is a positive integer greater than or equal to 2, extension directions of slits of the slit electrodes in any two adjacent domain areas in the n domain areas of the pixel unit are different, an acute angle between an extension direction of the slit in each domain area and a second direction is a predetermined angle, wherein the predetermined angle is greater than or equal to 35° and less than 45°, and the second direction intersects with the first direction, the display substrate comprises a first electrode, the another substrate comprises a second electrode, and at least one of the first electrode and the second electrode corresponding to each domain area has the slit;

wherein each slit electrode comprises a plurality of branch electrodes arranged parallel to each other and spaced apart in each domain area, an inter-domain main electrode extending along the second direction is provided between two adjacent domain areas, and the branch electrodes in two adjacent domain areas are in mirror symmetry with respect to the inter-domain main electrode;

wherein each domain area comprises a first side and a second side opposite to each other in the first direction, and the plurality of domain areas comprise a first domain area, a second domain area . . . and an nth domain area arranged sequentially from the first side to the second side, wherein a slit of the first domain area extends to a boundary of the first side such that the boundary of the first side forms a non-closed structure in which a plurality of the slits and a plurality of the branch electrodes are interleaved.

8. The display substrate according to claim 7, wherein the display substrate is an array substrate, the first electrode is a pixel electrode, the another substrate is a color film substrate, and the second electrode is a common electrode.

9. The display substrate according to claim 7, wherein the display substrate is a color film substrate, the first electrode is a common electrode, the another substrate is an array substrate, and the second electrode is a pixel electrode.

10. A display panel, comprising:

a pixel unit, comprising slit electrodes each having a slit;

wherein the pixel unit comprises at least two sub-pixels corresponding to different colors, each of the pixels comprises n domain areas arranged along a first direction, n is a positive integer greater than or equal to 2, extension directions of the slits of the slit electrodes in any two adjacent domain areas in the n domain areas of the pixel unit are different, an acute angle between an extension direction of the slit in each domain area and a second direction is a predetermined angle, the predetermined angle is greater than or equal to 30° and less than 45°, and the second direction intersects with the first direction;

an array substrate, comprising a first substrate, a first alignment film located on the first substrate, and a pixel electrode located on a side of the first alignment film away from the first substrate;

a color film substrate, comprising a second substrate, a second alignment film located on the second substrate, and a common electrode located on a side of the second alignment film away from the second substrate; and a liquid crystal molecule located between the array substrate and the color film substrate;

wherein alignment force of the first alignment film and/or the second alignment film is used to cause liquid crystal molecules to have different predetermined tilt angles in each domain area;

wherein each slit electrode comprises a plurality of branch electrodes arranged parallel to each other and spaced apart in each domain area, an inter-domain main electrode extending along the second direction is provided between two adjacent domain areas, and the branch electrodes in two adjacent domain areas are in mirror symmetry with respect to the inter-domain main electrode;

wherein each domain area comprises a first side and a second side opposite to each other in the first direction, and the plurality of domain areas comprise a first domain area, a second domain area . . . and an nth domain area arranged sequentially from the first side to the second side, wherein a slit of the first domain area extends to a boundary of the first side such that the boundary of the first side forms a non-closed structure in which a plurality of the slits and a plurality of the branch electrodes are interleaved.

11. The display panel according to claim 10, wherein the predetermined tilt angles of the liquid crystal molecules in the different domain areas are different and the liquid crystal molecules in two adjacent domain areas are not in mirror symmetry with respect to the second direction.

12. The display panel according to claim 11, wherein an angle between an alignment direction of the first alignment film and/or the second alignment film in each domain area and an extension direction of the slit in this domain area is less than or equal to a predetermined angle.

13. The display panel according to claim 12, wherein the predetermined angle is 0° to 15°.

14. The display panel according to claim 10, wherein the display panel is a vertically aligned display panel.

15. A display device comprising the display panel according to claim 10.

* * * * *